FEEDING AND ORIENTING DEVICE

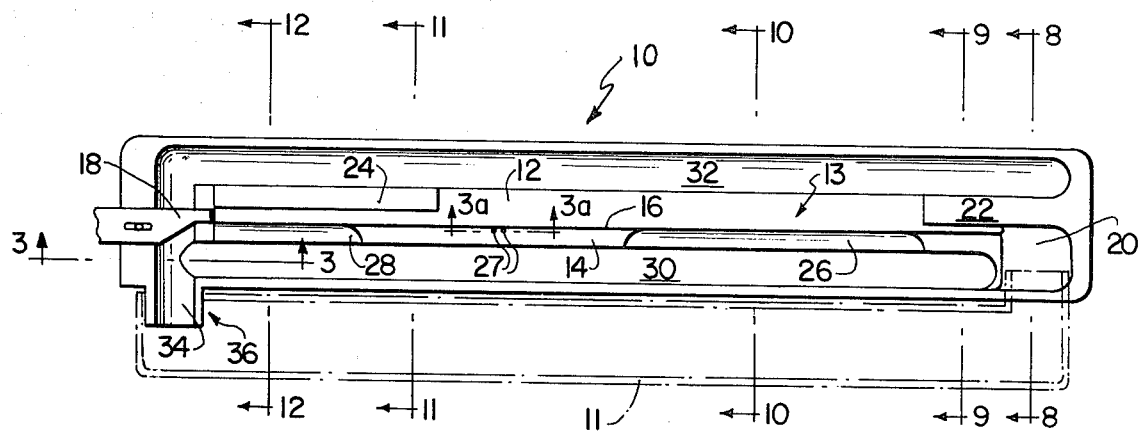
FIG. 1
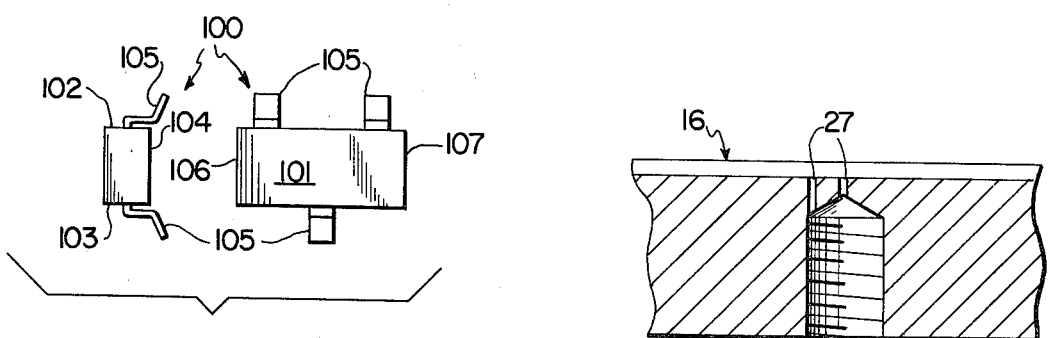
FIG. 2
FIG. 3a
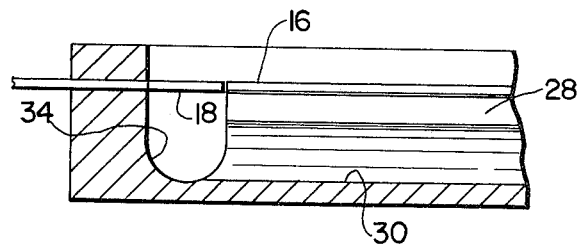
FIG. 3

This invention relates to a method and apparatus for feeding and for orienting, in a predetermined fashion, parts which are received in a random fashion.

The method and apparatus of the present invention are particularly applicable for feeding and for orienting in a predetermined fashion, electronic components having a body portion with terminals projecting therefrom. Transistors are typical of this construction and, as will be apparent from the description which follows, the method and apparatus of the invention are particularly applicable for feeding and orienting them, as well as other types of parts having projecting terminals.

In the past, numerous methods and different types of apparatus have been devised for feeding and orienting parts of the above described type, particularly electrical components. Many of these prior methods and apparatus are limited in application to one particular type of feeder apparatus, such as a vibratory bowl or linear track section, thereby limiting their versatility and adaptability in application.

It is therefore an object of the present invention to provide an improved method and apparatus for feeding and orienting parts having a body portion and at least one projecting terminal, said parts being received in mass and in random alignment.

It is another object of the present invention to provide apparatus of the above described type which is simply and easily manufactured, and which is adaptable to parts of different sizes and having different terminal configurations.

It is still another object of the present invention to provide apparatus for orienting parts of the above described type which is adaptable to various types of part handling systems.

Additionally, it is an object of this invention to provide apparatus for orienting in a predetermined consistent fashion those parts having leads which are adaptable to parts handling systems of the gravity feed type, a combination of gravity feed and vibration type, or vibratory parts feeders of either the circular or in-line type, as well as other similar types of systems or conveying means.

Other objects of the invention will in part be obvious and will in part appear hereinafter.

The above outlined objectives are accomplished by means of orienting apparatus which, according to the present invention, generally includes a guide rail or guide groove along which parts are fed such that a particular projecting terminal or terminals of the part are guided by the groove or rail to an area in which a fluid ejector is located for directing fluid against a selected terminal or terminals of misoriented parts to remove the misoriented parts from the guide rail or groove.

This orienting apparatus is adaptable to virtually any type of parts handling system which is capable of feeding the parts to it in a consistent fashion. In the disclosed embodiment, the apparatus is illustrated in operative relationship with a vibratory linear feeder system, but it is apparent from the description that it is easily adapted to many other types of systems.

The invention accordingly comprises the several steps and the relation of one or more of such steps with respect to each of the others and the apparatus embodying features of construction, combination of elements, and arrangements of parts which are adapted to affect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which:

FIG. 3 is a partial section along lines 3—3 of FIG. 1 to better illustrate the arrangement of a stop blade with a guide rail;

FIG. 3A is a sectional view taken along lines 3A—3A of FIG. 1.

DETAILED DESCRIPTION OF THE DRAWINGS

Figure 2:
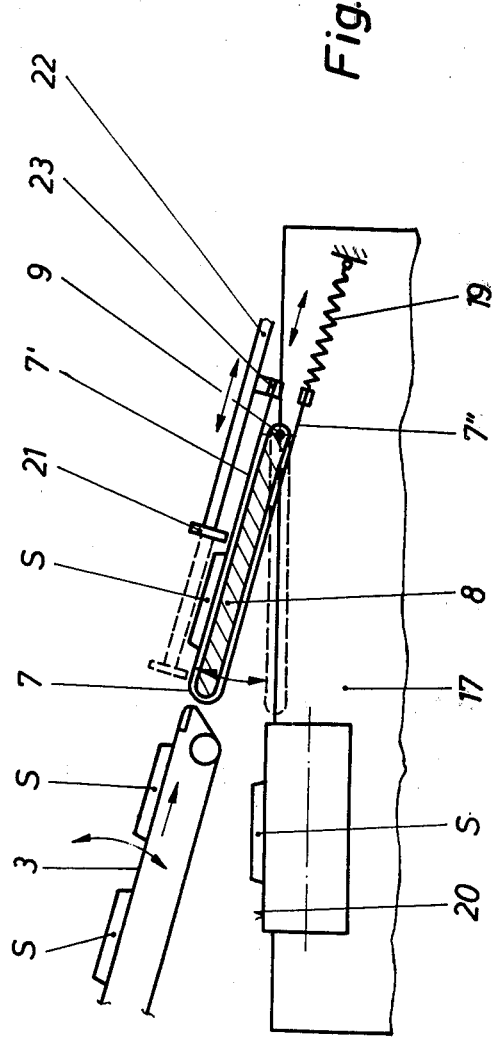
FIG. 2 is an example of one type of part (an electrical component) which may be fed and oriented with the method and apparatus of the instant invention.
Figure 4:
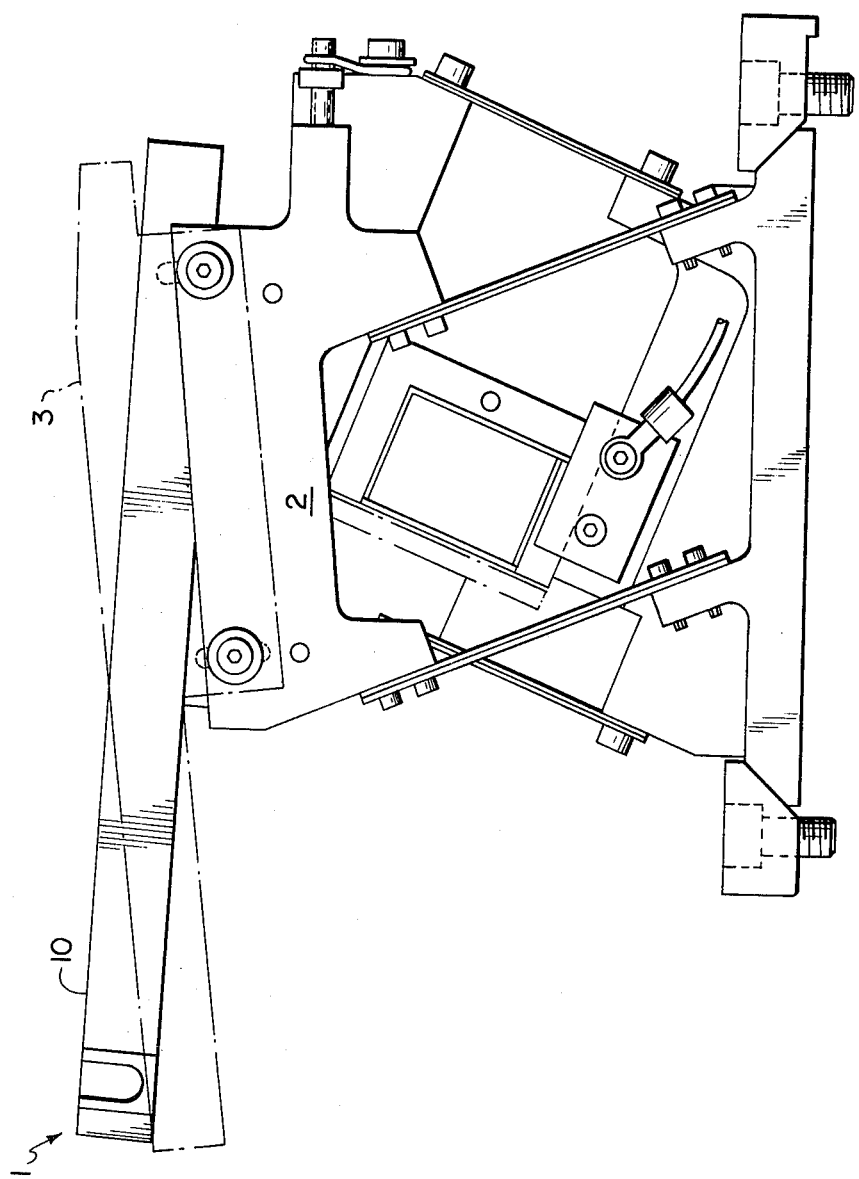
FIG. 4 is a front view of the apparatus of FIG. 1.
Figure 6:
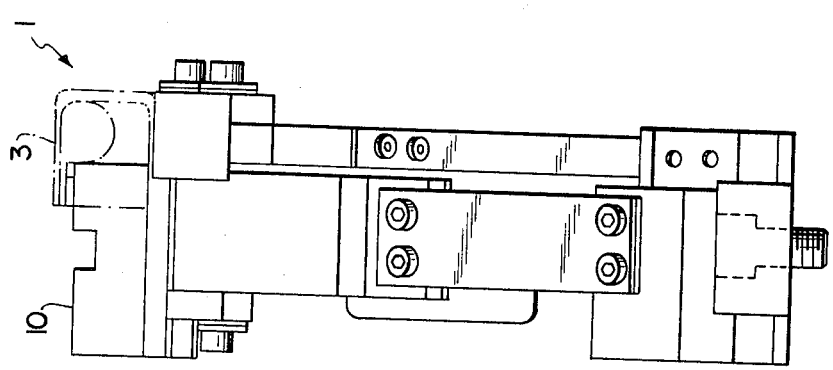
FIG. 6 is a left side view of FIG. 1.
Figure 5:
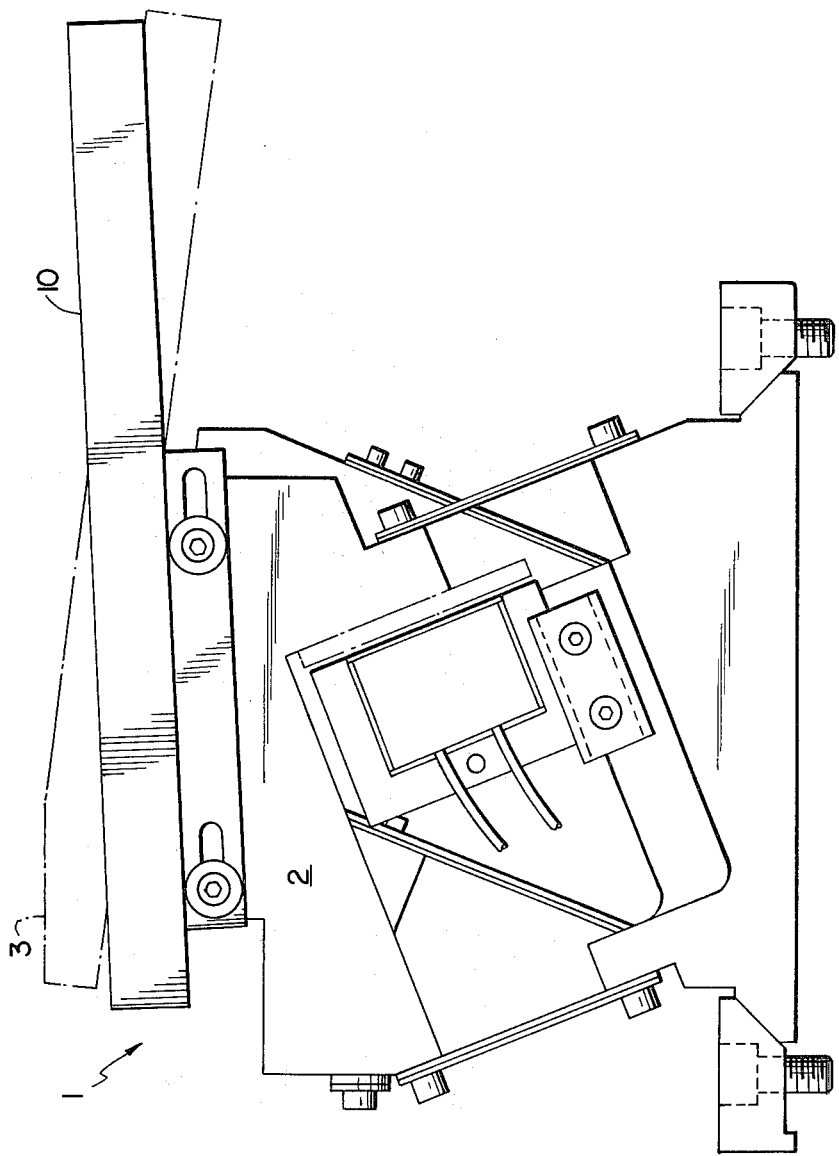
FIG. 5 is a back view of the apparatus of FIG. 1.
Figure 7:
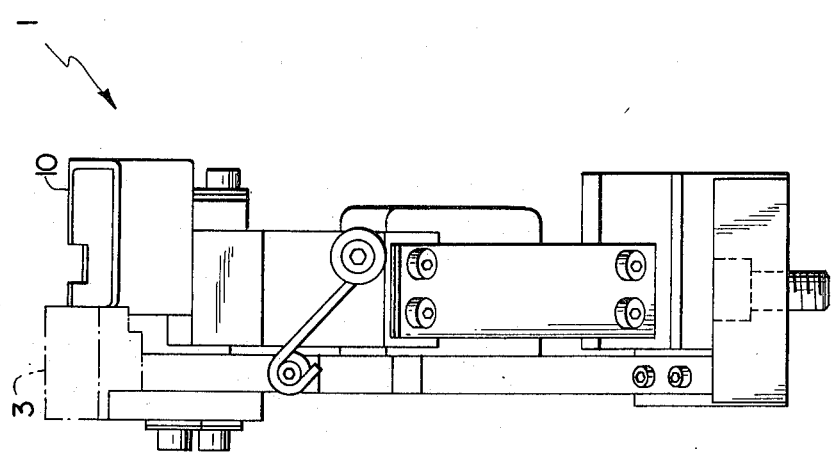
FIG. 7 is a right side view of FIG. 1.
Figure 8:
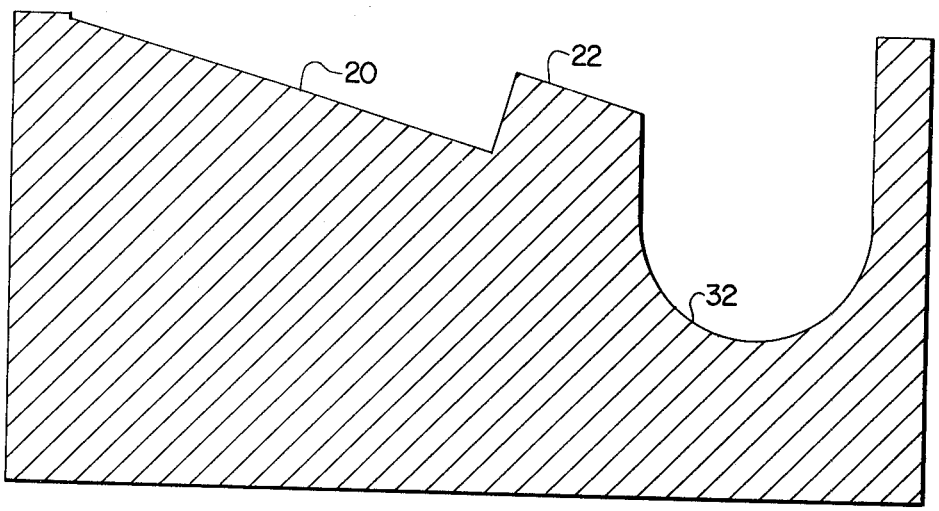
FIGS. 8–12 are sectional views corresponding to the section numerals of FIG. 1.
Figure 9:
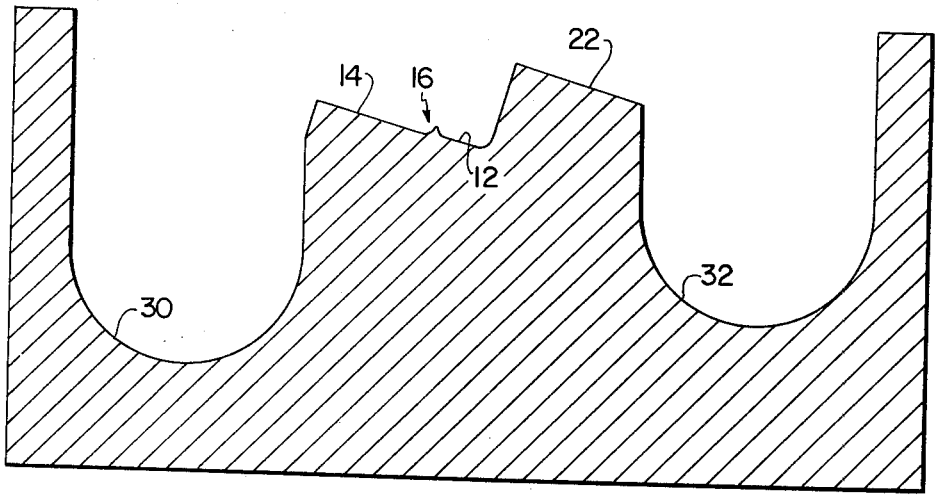
Figure 10:
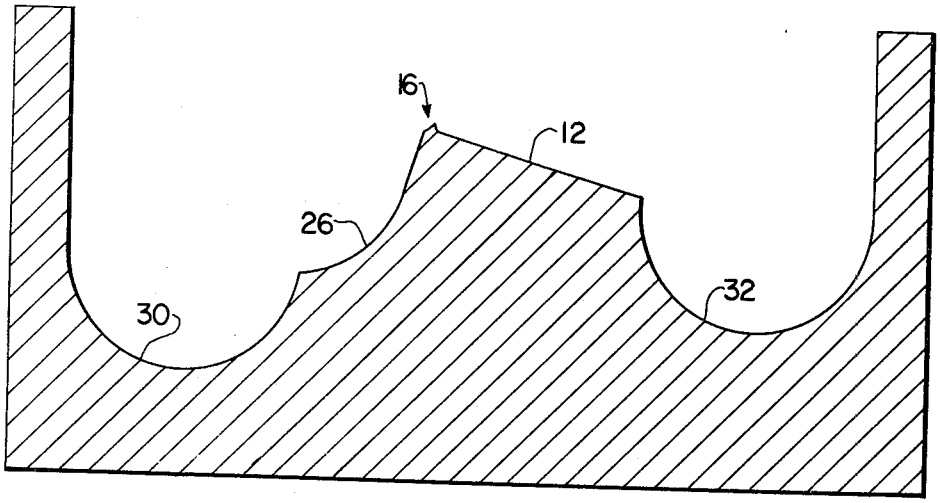
Figure 11:
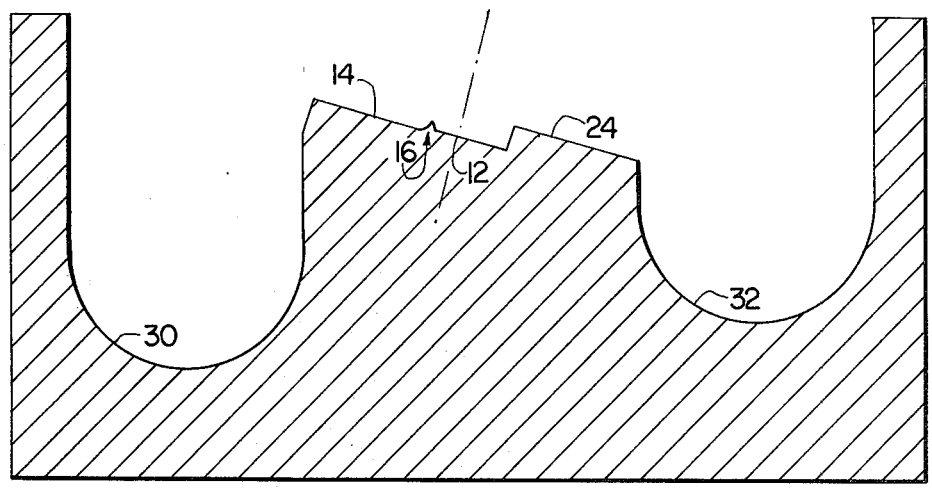
Figure 12:
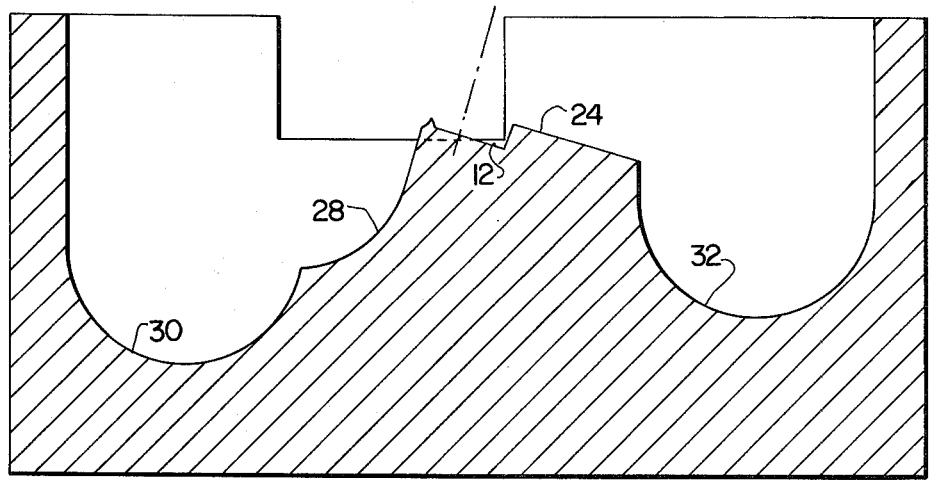

One embodiment of the apparatus of the invention, namely a vibrating linear feeder for the electrical component of FIG. 2, will now be described with reference to the drawings.

In FIGS. 4–7, a vibratory linear feeder apparatus is generally shown at 1. Feeder apparatus 1 includes a vibrator base 2 of the general type known to be old in the art of supporting and vibrating a feeder bed 10 and a recirculation trough 3.

Figure 1:
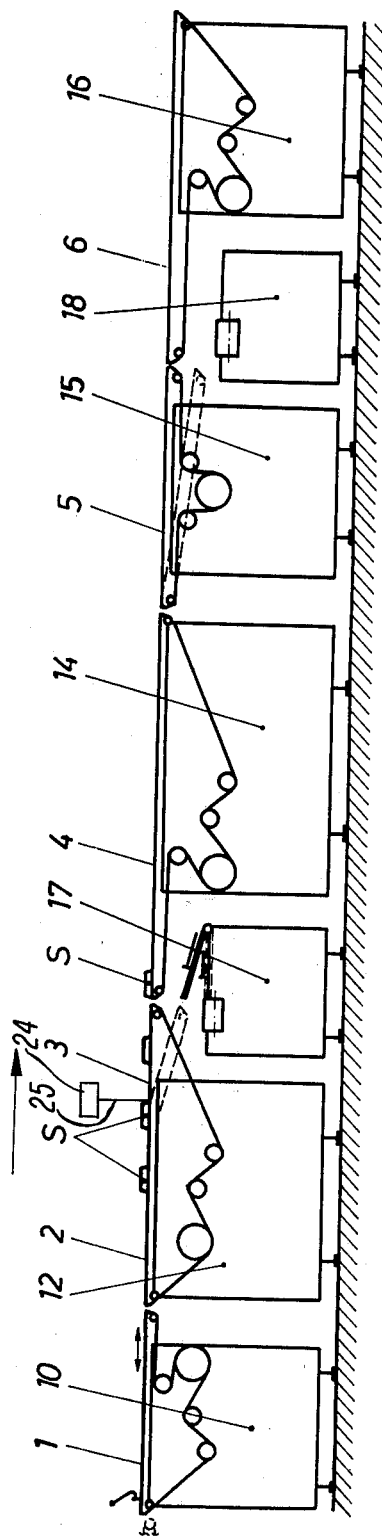
FIG. 1 is a top plan view of the vibratory linear feeder having aligning and orienting apparatus exemplary of the present invention adapted thereto.
Figure 13:
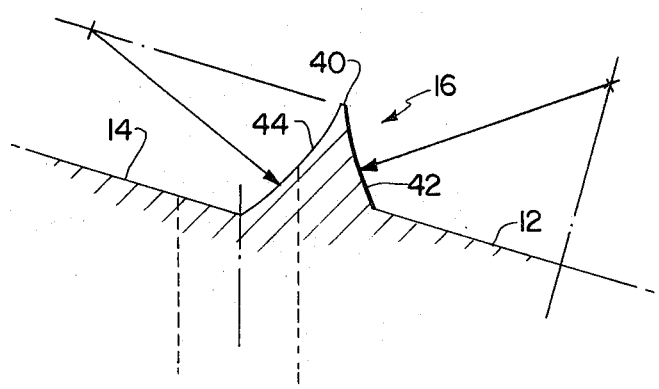
FIG. 13 is a magnified view of the shelf and guide rail of FIG. 1 and disclosing the stepped plane arrangement of the shelf with the guide rail separating the stepped planes.

Refering to FIG. 1, feeder bed 10 includes a stepped sloping shelf 13 having stepped plane surfaces 12 and 14 separated by an upstanding guide rail 16 (guide rail 16 and stepped plane surfaces 12, 14 are best seen in the magnified cross-sectional view of FIG. 13). In the loading area of feed bed 10 is an input step 20 coplanar with the top 40 of rail 16 and sloped to be parallel to plane surfaces 12 and 14. Input step 20 abuts a baffle 22, spaced from and parallel to guide rail 16, such that components 100 that are loaded onto input step 20 may slide down the sloping surface of input step 20 until they reach baffle 22; linear vibration causes these components 100 to slide off of input step 20 and to straddle guide rail 16, with projecting terminals 105 on each side of guide rail 16. Further along the path of travel of the components 100 along guide rail 16 is a cut-out portion 26 in plane surface 14. This cut-out portion 26 allows components 100 that are improperly positioned on guide rail 16 (with respect to their centers of gravity) to fall off of rail 16 and down cut-off portion 26 to a return channel 30. Due to the linear vibration, and sloping shelf 13 configuration, components 100 will be fed along guide rail 16 (to the left in FIG. 1) with one or more terminals 105 in sliding engagement with side 44 of guide rail 16. Further along the path of travel of components 100 are a pair of spaced orifices 27 in plane surface 14 and adjacent to side 44 of guide rail 16. The arrangement of orifices 27 allows differentiation between properly oriented components and misoriented components as they are fed along guide rail 16. Two jets of air exit orifices 27 to engage two leads 105 of a misoriented component 100, causing misoriented component 100 to be blown off of rail 16 such that it may slide down the plane surface 12 of sloping shelf 13. The pressure of the air exiting from orifices 27 is set such that a component 100 will be blown off of rail 16 if two terminals 105 of that component register simultaneously with the two orifices 27; if only one terminal 105 of component 100 registers with one orifice 27, the air pressure will not be enough to blow the component off of the rail due to the weight of the component 100. In this manner, as components 100 are fed along rail 16, those having two terminals 105 on side 44 of guide rail 16 (i.e., misoriented components 100) will be ejected from guide rail 16, and those components 100 having only one terminal on side 44 of guide rail 16 will continue to be fed along guide rail 16. Due to the width of plane surface 14, excess components may ride along plane surface 14 without straddling guide rail 16. In case this happens, a second cut-out portion 28 is provided so that these excess components 100 will drop off into return channel 30 in the unload area of feed bed 10. A stop blade 18 is positioned to engage the body 101 of components 100 at the end of guide rail 16 in the unload area so that a pickup device (not shown) may lift the properly oriented components off of shelf 13. In practice, a number of properly oriented components may back up along guide rail 16 in the unload area. To prevent vibration from causing these components to become misoriented or to slide down sloping shelf 13, a second baffle 24 is provided. A second return channel 32 is provided at the low end of sloping shelf 13 for reception of components that may slide down plane surface 12. Return channels 30 and 32 feed into return channel 34, which in turn feeds into recycling trough 3 for recycling to the load area of feed bed 10.

One prototype of this embodiment, which has yielded excellent results, includes a 60 Hz (120 vibrations per second) vibrator motor, along with a supplied air pressure of 9 psi to a 0.006 inch choke, choking the air pressure down to a value of approximately 3 psi that leaves orifices 27. Shelf 13 was angled at approximately 16° to horizontal, with guide rail 16 projecting approximately 0.014 inches above plane surface 14 and 0.009 inches above plane surface 12; both sides of guide rail 16 were concavely milled at a radius of 0.031 inches.

This prototype was proved to be jam-free and adaptable for many manufacturer's components; the body size was not important—only the lead length and position.

Since certain changes may be made, in carrying out the above method and in the construction set forth, without departing from the scope of the invention, it is intended that all matter contained in the above description or shown in the accompanying drawings shall be interpreted as illustrative and not in a limited sense.

It is also to be understood that the following claims are intended to cover all of the generic and specific features of the invention herein described and all statements of the scope of the invention which, as a matter of language, might be said to fall there between.

Having described the invention, what is claimed as new and is desired to be secured as letters patent is:

1. Apparatus for feeding, and orienting parts having a body and spaced terminals projecting in a predetermined fixed relationship from said body, said apparatus comprising:
   a laterally sloping shelf having a guide means along the length of said shelf adapted to prevent lateral sliding of said parts down said shelf and to orient said parts by sliding engagement of at least one of said terminals with said guide means as said parts are fed along said guide means;
   fluid ejection means adjacent to said guide means for positive fluid engagement with at least one of said terminals to eject improperly oriented parts as they are fed along said guide means.

2. An apparatus as in claim 1, wherein said guide means comprises a guide rail projecting upwardly from said shelf and having a top, a first side, and a second side.

3. An apparatus as in claim 2, said apparatus further comprising:
   an input step coplanar with and attached to the top of said guide rail at said load area;
   baffle means spaced from and extending along said first side of said guide rail for preventing said parts from sliding down said sloping shelf;
   cut-out means in said shelf and adjacent to said second side of said guide rail for receiving parts unbalanced with respect to said guide rail as they are fed along said guide rail to said unload area;
   stop means adjacent the top of said rail at said unload area for engaging and stopping the feed of said parts along said guide rail, whereby an unloader may remove said parts when they are stopped.

4. An apparatus as in claim 3, wherein said ejection means comprises:
   at least one fluid orifice for directing a fluid against at least one terminal of a part to disengage said terminal from said guide rail when said part is misoriented with respect to said guide rail.

5. An apparatus as in claim 4, wherein said ejection means further comprises spaced fluid orifices, the spacing of said orifices matching the spacing of at least two terminals of said part.

6. An apparatus as in claim 3, further comprising:
   return means lower than the surface of said shelf for receiving and feeding misoriented parts to a recycling means;
   said recycling means cooperating with said return means and said input step to recycle parts for feeding and orientation.

7. An apparatus having loading and unloading areas and adapted for feeding and orienting parts having a body and at least one terminal projecting in a predetermined fixed relationship from said body, said apparatus comprising:
   a stepped, sloping shelf having first and second planes separated by an upwardly projecting feed rail, said feed rail having a first side connected to said first plane, a second side connected to said second plane, and a top, said guide rail adapted to guide said parts by sliding engagement with at least one terminal of each part as it is fed along said guide rail;
   an input step, coplanar with said top at said load area, for receiving said parts;
   first baffle means, parallel to and spaced from a portion of said guide rail at said load area and extending toward said unload area, for obstructing the downward sliding movement of said parts relative to said shelf and said input step during loading and feeding of said parts along said guide rail;

a first cut-out means in said shelf, adjacent to said first side of said guide rail and spaced further along the path of travel of said parts along said guide rail than said first baffle means, for allowing misoriented parts to drop away from said shelf as they traverse the length of said cut-out means;

fluid ejection means, spaced further along said path of travel than said first cut-out means, for fluid ejection of misoriented parts by fluid contact with at least one terminal of said parts;

a second baffle means spaced from and parallel to said guide rail at said unload area for obstructing the downward sliding movement of said parts along said second plane;

a second cut-out means, in said shelf and opposite said guide rail from said second baffle means, for allowing excess parts in said unload area to drop away from said first plane;

stop means, adjacent to said guide rail in said unload area, for stopping properly oriented parts in said unload area, whereby a pickup means may remove properly oriented parts abutting said stop means;

ejection means adjacent said first side and spaced further along said feed rail from said load area than said first cut-out portion for positive ejection of improperly oriented components as they are guided past said ejection means by said feed rail;

a second baffle means spaced from and parallel to said feed rail at said unload area for obstructing the downward movement of said components along said second plane of said sloping shelf.

8. A method for orienting parts having a body and terminals projecting in a predetermined, fixed relationship from said body comprising the steps of:

feeding said parts along a guide means for guiding said parts with a greater number of terminals on one side of said guide means and at least one of a lesser number of terminals on the other side of said guide means;

providing fluid ejection means along the path of travel of said parts along said guide means for directing fluid against at least one terminal of said parts to eject a misoriented part from said guide means.

9. A method as in claim 8, including the step of ejecting misoriented parts by directing fluid against said greater number of said terminals.

* * * * *